(12) United States Patent
Jang et al.

(10) Patent No.: US 11,466,184 B2
(45) Date of Patent: Oct. 11, 2022

(54) ADHESIVE COMPOSITION

(71) Applicant: LG CHEM, LTD., Seoul (KR)

(72) Inventors: Mi Jang, Daejeon (KR); Sera Kim, Daejeon (KR); Ji Ho Han, Daejeon (KR); Kwang Joo Lee, Daejeon (KR); Bora Yeon, Daejeon (KR); Kwang Su Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 70 days.

(21) Appl. No.: 17/045,865

(22) PCT Filed: Jun. 17, 2019

(86) PCT No.: PCT/KR2019/007282
§ 371 (c)(1),
(2) Date: Oct. 7, 2020

(87) PCT Pub. No.: WO2019/245246
PCT Pub. Date: Dec. 26, 2019

(65) Prior Publication Data
US 2021/0155831 A1   May 27, 2021

(30) Foreign Application Priority Data

Jun. 20, 2018 (KR) .................. 10-2018-0071077
Jun. 14, 2019 (KR) .................. 10-2019-0070664

(51) Int. Cl.
| | |
|---|---|
| *C09J 143/04* | (2006.01) |
| *C09J 11/06* | (2006.01) |
| *C09J 183/06* | (2006.01) |
| *C08F 230/08* | (2006.01) |
| *C08K 5/00* | (2006.01) |
| *C08F 8/30* | (2006.01) |
| *C08K 5/17* | (2006.01) |

(52) U.S. Cl.
CPC ............. *C09J 143/04* (2013.01); *C08F 8/30* (2013.01); *C08F 230/08* (2013.01); *C08K 5/0025* (2013.01); *C08K 5/17* (2013.01); *C09J 11/06* (2013.01); *C09J 183/06* (2013.01)

(58) Field of Classification Search
CPC .................................................. C08F 230/08
See application file for complete search history.

(56) References Cited

U.S. PATENT DOCUMENTS

| | | | | |
|---|---|---|---|---|
| 6,017,974 A * | 1/2000 | Hosokawa | ............ | C08F 283/12 522/172 |
| 2001/0012509 A1 * | 8/2001 | Mitra | ............ | A61K 6/20 433/167 |
| 2008/0143003 A1 * | 6/2008 | Phelan | ............ | B29D 11/00317 351/159.28 |
| 2009/0196911 A1 | 8/2009 | Loubert et al. | | |
| 2010/0063222 A1 * | 3/2010 | Oikawa | ............ | C08F 290/14 528/37 |
| 2010/0072889 A1 * | 3/2010 | Takahashi | ............ | G03F 7/033 522/63 |
| 2011/0030881 A1 | 2/2011 | Sasaki et al. | | |
| 2011/0256482 A1 | 10/2011 | Tatsuhiro | | |
| 2012/0028380 A1 * | 2/2012 | Takamoto | ............ | B32B 27/306 156/60 |
| 2012/0064339 A1 * | 3/2012 | Yamagata | ............ | C09J 171/02 525/185 |
| 2013/0220533 A1 * | 8/2013 | Tonegawa | ............ | B32B 38/10 156/247 |
| 2014/0045319 A1 * | 2/2014 | Joo | ............ | C08F 8/10 525/289 |
| 2014/0295139 A1 * | 10/2014 | Miyahara | ............ | C08G 18/8077 428/141 |
| 2015/0031215 A1 * | 1/2015 | Mahoney | ............ | H01L 21/304 428/428 |
| 2015/0125632 A1 * | 5/2015 | Lee | ............ | C08G 18/8116 428/354 |
| 2015/0315346 A1 | 11/2015 | Lee et al. | | |
| 2016/0040042 A1 | 2/2016 | Kim et al. | | |
| 2018/0215965 A1 * | 8/2018 | Fukuhara | ............ | B32B 7/12 |

FOREIGN PATENT DOCUMENTS

| | | |
|---|---|---|
| CN | 103097485 A | 5/2013 |
| CN | 104903976 A | 9/2015 |
| CN | 105121582 A | 12/2015 |
| JP | 2011-054939 A | 3/2011 |
| JP | 2011-199015 A | 10/2011 |
| JP | 2011-221463 A | 11/2011 |
| JP | 2014-028906 A | 2/2014 |
| JP | 2014-189716 A | 10/2014 |
| JP | 2016-531167 A | 10/2016 |
| JP | 2017-504976 A | 2/2017 |
| KR | 10-2006-0130397 A | 12/2006 |
| KR | 10-2009-0025238 A | 3/2009 |
| KR | 10-2011-0115064 A | 10/2011 |
| KR | 10-2011-0132345 A | 12/2011 |
| KR | 10-2012-0087068 A | 8/2012 |
| KR | 10-2012-0093102 A | 8/2012 |
| KR | 10-2013-0066273 A | 6/2013 |
| KR | 10-2015-0059127 A | 5/2015 |
| KR | 10-2017-0055552 A | 5/2017 |
| KR | 10-2017-0128210 A | 11/2017 |
| KR | 10-2018-0030692 A | 3/2018 |

(Continued)

OTHER PUBLICATIONS

International Search Report issued for International Application No. PCT/KR2019/007282 dated Oct. 1, 2019, 4 pages.

(Continued)

*Primary Examiner* — Marc S Zimmer
(74) *Attorney, Agent, or Firm* — Rothwell, Figg, Ernst & Manbeck, P.C.

(57) ABSTRACT

The present invention provides an adhesive composition that exhibits excellent adhesive force, and can be easily separated by photocuring during a peeling step, in which foaming and lifting are not generated even after a high temperature process.

15 Claims, 4 Drawing Sheets

(56) References Cited

FOREIGN PATENT DOCUMENTS

| | | |
|---|---|---|
| KR | 10-2018-0036510 A | 4/2018 |
| TW | 200827423 A | 7/2008 |
| TW | 201533199 A | 9/2015 |
| WO | 2008-035791 A1 | 3/2008 |
| WO | 2014-020821 A1 | 2/2014 |
| WO | 2016-056269 A1 | 4/2016 |
| WO | 2016-148110 A1 | 9/2016 |
| WO | 2017-014269 A1 | 1/2017 |

OTHER PUBLICATIONS

Extended European Search Report dated Jul. 6, 2021, of the corresponding European Patent Application No. 19823310.8, 8 Pages.

\* cited by examiner

[Fig. 1a]
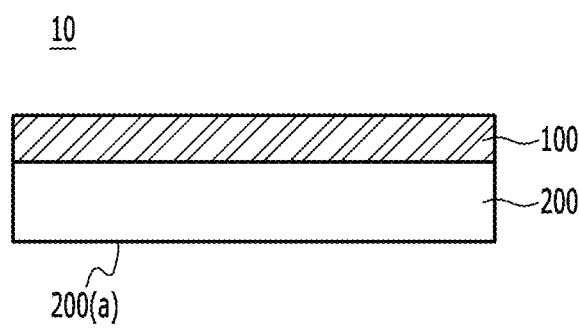
[Fig. 1b]
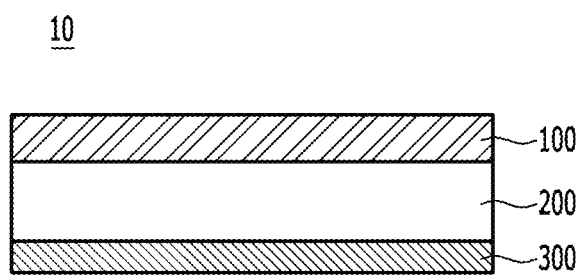

[Fig. 2a]
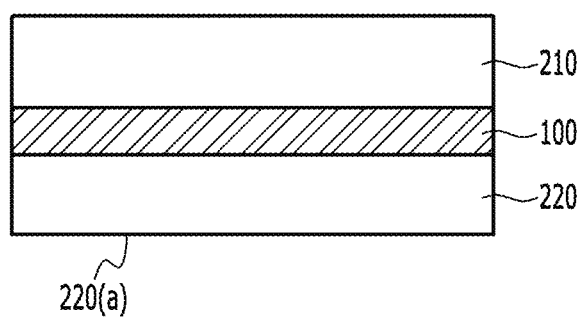
[Fig. 2b]
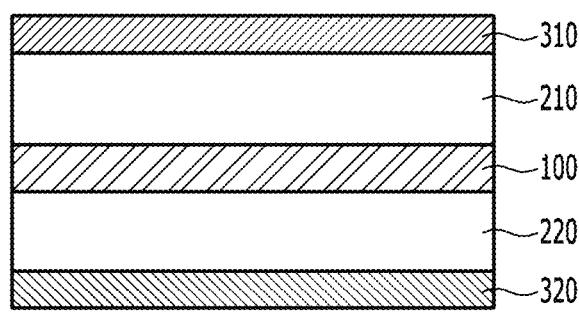

[Fig. 3]
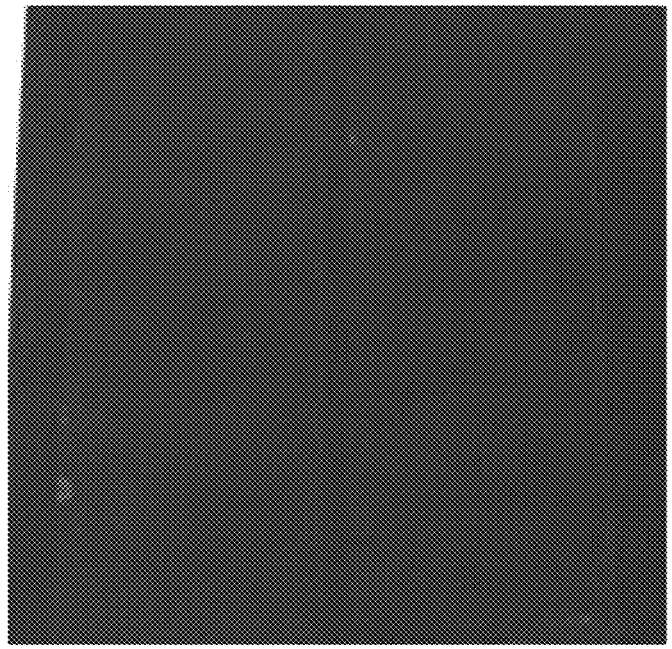

[Fig. 4]
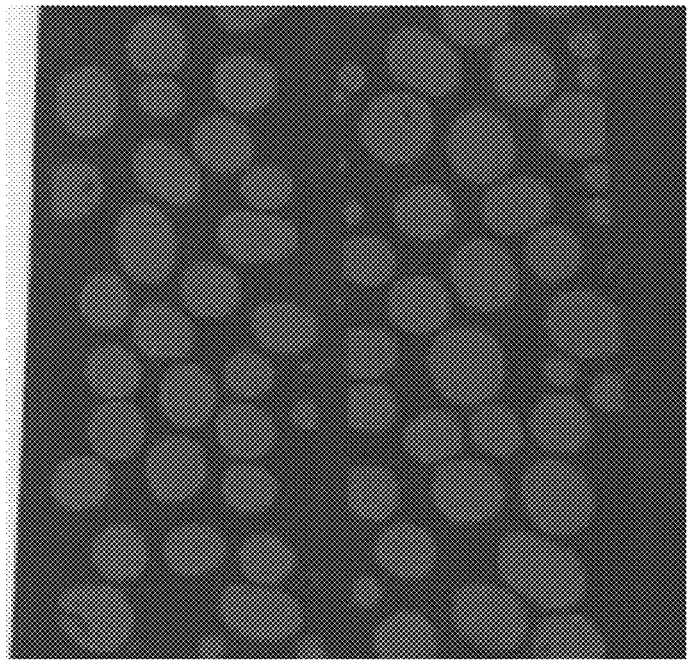

ADHESIVE COMPOSITION

CROSS-REFERENCE TO RELATED APPLICATION

This application is a 35 U.S.C. 371 National Phase Entry Application from PCT/KR2019/007282 filed on Jun. 17, 2019, designating the United States, which claims the benefit of Korean Patent Application No. 10-2018-0071077 filed on Jun. 20, 2018 and Korean Patent Application No. 10-2019-0070664 filed on Jun. 14, 2019 with the Korean Intellectual Property Office, the disclosures of which are herein incorporated by reference in their entirety.

BACKGROUND OF THE INVENTION

(a) Field of the Invention

The present invention relates to an adhesive composition.

(b) Description of the Related Art

With the recent tendency of miniaturization, thinning and large scale of electronic devices, a need of high density and high integration of a semiconductor package is rapidly increasing. Reflecting this, the size of a semiconductor chip is becoming larger more and more, and simultaneously, the thickness of the chip is becoming thinner.

A thin semiconductor chip is difficult to handle during the manufacturing process, and thus, a method of temporarily fixing the thin semiconductor chip using an adhesive sheet, and the like, and processing, treating and transferring it while temporarily fixed is being applied.

Such an adhesive sheet should not only exhibit excellent adhesive force, but also have peelability so that it may not damage a semiconductor chip, and simultaneously, residue may not remain on the surface, in the process of separating the fixed thin semiconductor chip after a series of processes are completed. And, since many processes of the semiconductor manufacturing process are conducted under high temperature conditions, high heat resistance is required so that adhesive force may not be lowered by thermal decomposition, and the like, during the processes. Particularly, in the semiconductor process, processes of ultra-high temperature more than 200° C. are conducted, but if heat resistance is low, due to foaming and lifting between the temporary adhesive sheet and thin substrate, defects of appearance were generated.

Meanwhile, as temporary adhesion material, UV curable adhesive of which adhesive force is lowered by UV irradiation is being used recently. However, in the case of such UV curable adhesive, due to the thermal decomposition of additives such as a photoinitiator in the adhesive during a high temperature process or migration of additives, adhesive force was insufficiently lowered in a peeling step.

Thus, there is a demand for development of adhesive material in which foaming and lifting are not generated even after a high temperature process, and which can be easily separated, as an adhesive sheet for temporary fixing.

BRIEF DESCRIPTION OF THE INVENTION

The present invention provides an adhesive composition that exhibits excellent adhesive force, does not generate foaming and lifting even after a high temperature process, and can be easily separated by photocuring during a peeling step.

According to the present invention,
an adhesive composition is provided, which comprises
(a) binder resin comprising (meth)acrylate resin having silicon-based functional groups and photoreactive functional groups;
(b) a photoinitiator; and
(c) a multifunctional crosslinking agent,
wherein the (meth)acrylate resin having silicon-based functional groups and photoreactive functional groups comprises first repeat units derived from (meth)acrylate monomers having silicon-based functional groups, and second repeat units derived from crosslinkable monomers having one or more reactive functional groups selected from the group consisting of a hydroxyl group, a carboxy group and a nitrogen-containing functional group, and
based on the total weight of the second repeat units, 20 to 95 wt % of the second repeat units include photoreactive functional groups at the side chains.

DETAILED DESCRIPTION OF THE INVENTION

Hereinafter, an adhesive composition, an adhesive sheet for temporary fixing using the same, and a method for manufacturing the same according to the embodiments of the present invention will be explained in detail.

First, technical terms in the present specification are only for mentioning specific embodiments, and they are not intended to restrict the present invention unless there is a particular mention about them A singular expression includes a plural expression thereof, unless it is expressly stated or obvious from the context that such is not intended.

The meaning of the term "comprise" used herein embodies specific characteristics, areas, essences, steps, actions, elements, and/or components, and does not exclude existence or addition of other specific characteristics, areas, essences, steps, actions, elements, components, and/or groups.

As used herein, terms "a first", "a second" and the like are used to explain various constructional elements, and they are used only to distinguish one constructional element from other constructional elements. For example, the first constructional element may be named as the second constructional element, and similarly, the second constructional element may be named as the first constructional element within the scope of the right of the present invention.

As the result of continuous studies of the present inventors, it was found out that by using polymer comprising repeat units of specific structures as binder resin when preparing an adhesive composition useful for a temporary fixing adhesive sheet used in a semiconductor manufacturing process, excellent adhesive force may be realized during a semiconductor manufacturing process, and sufficient adhesive force lowering effect may be exhibited by photocuring in a peeling step after a high temperature process. And, due to the improvement in heat resistance, even during a high temperature process, excellent appearance property may be exhibited without foaming or lifting. Thus, if an adhesive sheet for temporary fixing prepared using the adhesive composition is used as a protection film or a carrier film in a semiconductor manufacturing process, the efficiency of the semiconductor manufacturing process can be increased, and the quality of the manufactured semiconductor can be improved.

I. Adhesive Composition

Specifically, the adhesive composition according to one embodiment of the present invention comprises (a) binder resin comprising (meth)acrylate resin having silicon-based functional groups and photoreactive functional groups; (b) a photoinitiator; and (c) a multifunctional crosslinking agent, and optionally, (d) a tertiary amine compound. Hereinafter, each constructional element will be explained in detail.

(a) Binder Resin

In the adhesive composition, the (a) binder resin comprises (meth)acrylate resin having silicon-based functional groups and photoreactive functional groups, which comprises (a1) first repeat units derived from (meth)acrylate monomers having silicon-based functional groups, and (a2) second repeat units derived from crosslinkable monomers having one or more reactive functional groups selected from the group consisting of a hydroxy group, a carboxy group and a nitrogen-containing functional group, and based on the total weight of the (a2) second repeat units, 20 to 95 wt % of the second repeat units include photoreactive functional groups at the side chains.

As such, by comprising as binder, (meth)acrylate resin of a random copolymer structure, which comprises first repeat units derived from (meth)acrylate monomers having silicon-based functional groups and second repeat units derived from crosslinkable monomers capable of forming a crosslink structure together with the first repeat units, wherein a part of the second repeat units include photoreactive functional groups at the side chains, excellent adhesion stability can be realized even during a high temperature process.

In the (meth)acrylate resin having silicon-based functional groups and photoreactive functional groups, the (a1) first repeat unit comprise a structure derived from a (meth) acrylate compound having a silicon-based functional group, and the silicon-based functional group may be a polyalkylsiloxane group including 1 to 200 alkyl siloxane, a polyarylsiloxane group including 1 to 200 arylsiloxane, or a polyorganosiloxane group including 2 to 200 alkylsiloxane and arylsiloxane in combination, wherein the alkyl may be a C1-20 alkyl group such as methyl, ethyl or propyl, and the aryl may be a C6-20 aryl group such as phenyl. For example, the silicon-based functional group may be one of the functional groups represented by the following Chemical Formulas 1a to 1c:

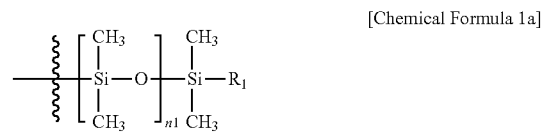
[Chemical Formula 1a]

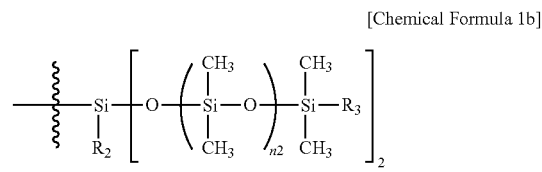
[Chemical Formula 1b]

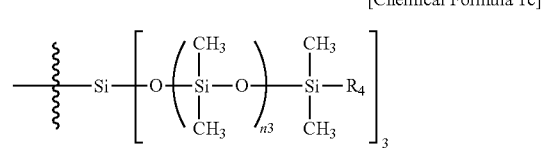
[Chemical Formula 1c]

In the Chemical Formulas 1a to 1c $R_1$ to $R_4$ are each independently, a hydrogen atom, or a C1-10 alkyl group, specifically, a hydrogen atom, or a C1-4 alkyl group, more specifically, a hydrogen atom or a methyl group.

And, n1 to n3 denote each independently, an integer of 1 to 200, specifically an integer of 5 to 100.

As such, since the silicon-based functional group included in the first repeat unit has a siloxane bond having higher bonding energy compared to a carbon-carbon bond, it may increase the heat resistance of binder resin, thereby increasing a thermal decomposition temperature. Thereby, excellent adhesion stability may be realized even during a high temperature process, and foaming or lifting may be prevented.

More specifically, the (a1) first repeat unit may comprise at least one structure derived from a (meth)acrylate compound having a silicon-based functional group, represented by the following Chemical Formulas 2a to 2d:

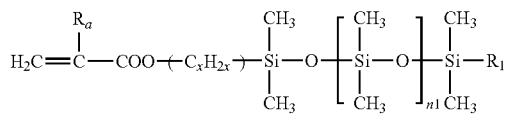
[Chemical Formula 2a]

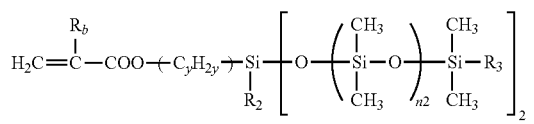
[Chemical Formula 2b]

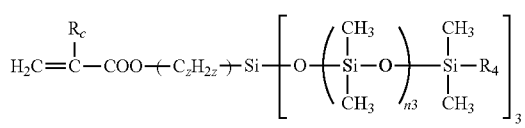
[Chemical Formula 2c]

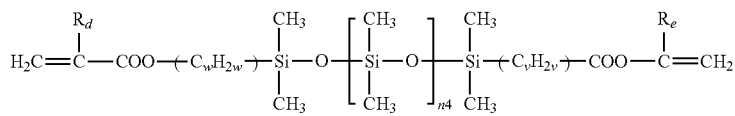
[Chemical Formula 2d]

in the Chemical Formulas 2a to 2d, $R_1$ to $R_4$ are each independently, a hydrogen atom, or a C1-10 alkyl group, more specifically, a hydrogen atom, or a C1-4 alkyl group.

$R_a$ to $R_e$ are each independently, hydrogen or a methyl group, x, y, z, w and v are each independently, an integer of 1 to 3, and n1 to n4 denote each independently, an integer of 1 to 200, more specifically, an integer of 5 too 100.

And, the (meth)acrylate compound having silicon-based functional groups includes a (meth)acrylate group at one end or both ends, and is random-copolymerized together with monomers for preparing binder resin such as ethylhexyl acrylate (EHA), hydroxyethyl acrylate (HEA), and the like.

And, the (meth)acrylate compound having silicon-based functional groups may have a weight average molecular weight (Mw) of 10 to 10,000 g/mol, more specifically 1,000 to 5,000 g/mol. Withint the above range of weight average molecular weight, excellent effects in terms of heat resistance and compatibility may be exhibited.

The (meth)acrylate compound having silicon-based functional groups may be directly prepared using known organic chemical reactions, or is commercially available such as Silaplane™ FM-0721, Silaplane™ FM-0711, or Silaplane™ FM-0725, and the like, manufactured from JNC Corporation.

The (a1) first repeat units may be included in the amount of 10 to 90 wt %, based on the total weight of the (meth)acrylate resin having silicon-based functional groups and photoreactive functional groups. If the content of the first repeat units is less than 10 wt %, the heat resistance improvement effect may be insignificant, and comparatively, the content of the (a2) second repeat units may excessively increase, and thus, unreacted functional groups that do not participate in a crosslinking reaction may remain, rendering detachment during peeling difficult. If it exceeds 90 wt %, the surface energy of the binder resin may excessively decrease, and thus, there is a concern about deterioration of adhesive force of the adhesive composition. More specifically, the (a1) first repeat units may be included in the amount of 20 to 80 wt %, even more specifically 20 to 40 wt %, based on the total weight of the (meth)acrylate resin having silicon-based functional groups and photoreactive functional groups.

In the present invention, the content of each repeat unit in the binder resin may be calculated through NMR analysis.

Meanwhile, in the (meth)acrylate resin having silicon-based functional groups and photoreactive functional groups, the (a2) second repeat unit comprises a structure derived from crosslinkable monomers comprising one or more functional groups selected from the group consisting of a hydroxy group, a carboxy group and a nitrogen-containing functional group, wherein the reactive functional group such as a hydroxy group, a carboxy group and a nitrogen-containing functional group in the second repeat unit may react with a multifunctional crosslinking agent when heat cured, to realize a three dimensional crosslinking structure. As the result, a high crosslinking density may be afforded to an adhesive composition, and a cohesive force may be increased to exhibit a sufficient fixing force during a semiconductor process.

Specifically, the second repeat unit may be derived from (meth)acrylate monomers containing hydroxy groups, and as such monomers, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, and the like may be mentioned. These monomers may be used alone or in combinations of two or more kinds.

And, the second repeat unit may be derived from (meth)acrylic acid or (meth)acrylate monomers comprising carboxy groups, and as such monomers, (meth)acrylic acid, crotonic acid, isocrotonic acid, maleic acid, fumaric acid, itaconic acid, carboxyethyl (meth)acrylate, carboxypentyl (meth)acrylate, and the like may be mentioned. These monomers may be used alone or in combinations of two or more kinds. And, the second repeat unit may be derived from (meth)acrylic acid or (meth)acrylate monomers comprising nitrogen-containing functional groups such as a nitrile group, a N-vinyl group, or an acrylamide group, and the like, and as such monomers, (meth)acryloylonitrile, N-vinyl pyrrolidone, N-vinyl caprolactam, and 3-(N-methylaminopropyl) methacrylamide, and the like may be mentioned. These monomers may be used alone or in combinations of two or more kinds.

The second repeat units derived from crosslinkable monomers may be included in the content of 10 to 80 wt %, based on the total weight of the (meth)acrylate resin having silicon-based functional groups and photoreactive functional groups. If the content of the second repeat units is less than 10 wt %, durability and reliability of the adhesive composition may be deteriorated, and if it exceeds 80 wt %, adhesive force and peel strength may be deteriorated. More specifically, the second repeat units derived from crosslinkable monomers may be included in the content of 10 to 70 wt %, even more specifically 20 to 40 wt %, based on the total weight of the (meth)acrylate resin having silicon-based functional groups and photoreactive functional groups.

And, a part of the second repeat units may include photoreactive functional groups, specifically, functional groups including a carbon-carbon double bond such as a vinyl group, an allyl group or a (meth)acryloyl group, and the like, at the side chains.

The photoreactive functional group introduced at the side chains of the second repeat units, when irradiated by UV, may react by a photoinitiator to form a three dimensional crosslinking structure, and thus, significantly lower the adhesive force of the adhesive composition by increasing the modulus of the adhesive. Thereby, the adhesive composition may be easily peeled off without residue.

The photoreactive functional groups may be introduced at the side chains of the second repeat units, by copolymerizing monomers for forming (meth)acrylate resin having silicon-based functional groups and photoreactive functional groups, for example, (meth)acrylate monomers having silicon-based functional groups, with crosslinkable monomers comprising one or more functional groups selected from the group consisting of a hydroxyl group, a carboxy group and a nitrogen-containing functional group, and then, progressing an addition or condensation reaction with a compound comprising functional groups that can be subjected to an addition reaction with the functional groups of the crosslinkable monomers, and photoreactive functional groups. As the functional groups that can be subjected to an addition reaction with the functional groups of the crosslinkable monomers, an isocyanate group, an epoxy group, or an aziridine group, and the like may be mentioned, and they may be appropriately selected according to the kind of the functional groups included in the second repeat units.

As specific examples of the compound for the introduction of photoreactive functional groups, as a compound capable of reacting with a hydroxyl group of the second repeat unit, (meth)acryloyloxy isocyante, (meth)acryloyloxy methyl isocyante, 2(meth)acryloyloxy ethyl isocyante, 3-(meth)acryloyloxy propyl isocyante, 4-(meth)acryloyloxy butyl isocyante, m-propenyl-α,α-dimethylbenzylisocyanate, methacryloyl isocyanate, or allyl isocyante; a (meth)acryloyl diisocyanate or polyisocyanate obtained by reacting a diisocynate compound or a polyisocyanate compound with 2-hydroxy ethyl (meth)acrylate, and the like may be mentioned. And, as the compound capable of reacting with a carboxy group of the second repeat unit, glycidyl (meth) acrylate or allyl glycidyl ether, and the like may be mentioned.

The photoreactive functional groups may be substituted and included in the content of 20 to 95 wt %, based on the total weight of the second repeat units. If the content of the second repeat units including photoreactive functional groups is less than 20 wt %, an adhesive force may not be sufficiently lowered by UV irradiation, and if it exceeds 95 wt %, the cohesive force of the adhesive composition may be deteriorated before UV irradiation. Considering the significant peel strength improvement effect according to the introduction of photoreactive functional groups, the photoreactive functional groups may be included in 60 to 95 wt %, more specifically 70 to 95 wt % of the second repeat units, based on the total weight of the second repeat units.

And, the (meth)acrylate resin having silicon-based functional groups and photoreactive functional groups may further comprise, optionally, (a3) third repeat units derived from other (meth)acrylate compounds, in addition to the above explained (a1) first repeat units and (a2) second repeat units.

The (a3) third repeat unit may be derived from a (meth) acrylate compound, which does not include the above explained specific functional groups, specifically, a silicon-based functional group, a hydroxyl group, a carboxy group, and a nitrogen-containing functional group, and it may include a structure derived from aliphatic (meth)acrylate, alicyclic (meth)acrylate, or aromatic (meth)acrylate, and the like.

As the aliphatic (meth)acrylate, alkyl (meth)acrylate having a C1-20 alkyl group may be mentioned, and specifically, methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth) acrylate, or isononyl (meth)acrylate, and the like may be mentioned.

As the alicyclic (meth)acrylate, cycloalkyl (meth)acrylate having a C3-30 cycloalkyl group, specifically, isobornyl acrylate (IBOA), trimethylcyclohexyl acrylate, cyclopentyl (meth)acrylate, cyclohexyl (meth)acrylate, dicyclopentanyl methacrylate, or dicyclopentenyl oxy methacrylate, and the like may be mentioned.

As the aromatic (meth)acrylate, alkyl (meth)acrylate having a C6-30 aromatic group, specifically, phenylpropyl (meth)acrylate, o-phenylphenol EO (meth)acrylate, 3-phenylphenoxypropyl (meth)acrylate, or phenol EO (meth) acrylate, and the like may be mentioned.

Among them, it may be preferable to include repeat units derived from a (meth)acrylate compound having a C1-12 alkyl group, more preferably a C1-6 alkyl group, in that an adhesive force may be easily controlled without lowering the cohesive force of the adhesive composition, and the wettability to a wafer surface, water resistance and peel strength of the adhesive composition may be further increased.

The (a3) third repeat units may be included in the content of 5 to 70 wt %, based on the total weight of the (meth) acrylate resin having silicon-based functional groups and photoreactive functional groups. If the content of the third repeat units is less than 5 wt %, the durability and reliability of the adhesive composition may be deteriorated, and if it exceeds 70 wt %, an adhesive force and peel strength may be deteriorated.

More specifically, in case further comprising the (a3) third repeat units, the (meth)acrylate resin having silicon-based functional groups and photoreactive functional groups may comprise, based on the total weight of the resin, 20 to 80 wt % of the (a1) first repeat units, 10 to 70 wt % of the (a2) second repeat units, and 5 to 70 wt % of the (a3) third repeat units, even more specifically, 20 to 40 wt % of the (a1) first repeat units, 20 to 40 wt % of the (a2) second repeat units, and 40 to 60 wt % of the (a3) third repeat units. When each repeat unit in the (meth)acrylate resin having silicon-based functional groups and photoreactive functional groups is included in the above described range, more excellent adhesive force and peel strength after UV irradiation may be exhibited, without concern about deterioration of the durability and reliability of an adhesive composition.

In the present invention, the (meth)acrylate resin having silicon-based functional groups and photoreactive functional groups may be prepared by the polymerization reaction of a monomer mixture providing each repeat unit, followed by the introduction of photoreactive functional groups.

Specifically, the polymerization reaction may be progressed by solution polymerization, photopolymerization, bulk polymerization, suspension polymerization, or emulsion polymerization, and the like, and among them, it may be conducted by solution polymerization using a thermal initiator, in that the process is easy, and prepared polymer may have excellent uniformity. The solution polymerization may be conducted at a polymerization temperature of 50 to 140° C., after mixing an initiator while a (meth)acrylate compound having silicon-based functional groups, crosslinkable monomers, and optionally, other (meth)acrylate compounds are uniformly mixed, Wherein, as the initiator, an azo-based initiator such as azobis isobutyronitrile or azobiscyclohexane carbonitrile, and the like; a peroxide-based initiator such as benzoyl peroxide or acetyl peroxide, and the like may be mentioned; and they may be used alone or in combinations of two or more kinds.

After the polymerization reaction is completed, in order to introduce photoreactive functional groups at a part of the second repeat units derived from crosslinkable monomers, to the resulting polymerization product, a compound comprising functional groups that can be subjected to an addition reaction with the reactive functional groups of the crosslinkable monomers and photoreactive functional groups may be added, and a condensation or addition reaction may be progressed to prepare (meth)acrylate resin having silicon-based functional groups and photoreactive functional groups.

In the present invention, the properties of the (meth) acrylate resin having silicon-based functional groups and photoreactive functional groups, such as weight average molecular weight and glass transition temperature, and the like, may be adjusted so as to exhibit excellent effect when applied for an adhesive composition, by controlling the kind and content of the monomers during the preparation, and polymerization conditions, and the like. Specifically, the (meth)acrylate resin having silicon-based functional groups and photoreactive functional groups may have weight average molecular weight (Mw) of 50,000 g/mol to 2,000,000 g/mol, preferably 700,000 g/mol to 1,500,000 g/mol, or 1,000,000 g/mol to 1,200,000 g/mol. The above range of weight average molecular weight is preferable in that optimum coatability and cohesive force may be exhibited, and thus, residue may not remain on the adherend in a peeling step.

And, throughout the specification, the weight average molecular weight means weight average molecular weight (unit: g/mol) converted in terms of polystyrene, measured by GPC (gel permeation chromatography). During the process of measuring weight average molecular weight converted in terms of polystyrene, measured by GPC, commonly known analysis equipment and detectors such as a refractive index detector and analysis column may be used, and commonly used temperature conditions, solvents, flow rate may be applied. As specific example of the measuring conditions, a temperature of 30° C., a chloroform solvent and the flow rate of 1 mL/min may be mentioned.

And, the (meth)acrylate resin having silicon-based functional groups and photoreactive functional groups may have a glass transition temperature (Tg) of −100° C. to −5° C., preferably −70° C. to −10° C., or −45 to −30° C. The above range of a glass transition temperature is preferable in that optimum coatability and cohesive force may be exhibited, and thus, adhesive operability may be excellent in the initial adhesion step, and residue may not remain on the adherend in the peeling step.

In the present invention the glass transition temperature (Tg) of the (meth)acrylate resin having silicon-based functional groups and photoreactive functional groups is measured with DSC (Differential Scanning calorimeter).

And, the (a) binder resin may further comprise compounds used as binder resin in the conventional adhesive composition, in addition to the (meth)acrylate resin having silicon-based functional groups and photoreactive functional groups. In this case, the above compounds may be included in the content of 20 wt % or less, more specifically 10 to 5 wt %, based on the total weight of the binder resin, within a range which does not hinder the effect of the present invention.

The (a) binder resin having the above described construction may be included in the content of 50 to 97 wt %, based on the total weight of the adhesive composition. If the content of the binder resin is less than 50 wt %, it may be difficult to secure coatability and operability, and if it exceeds 97 wt %, it may be difficult to obtain sufficient adhesive force. More specifically, the a) binder resin having the above described construction may be included in the content of 70 to 90 wt %, based on the total weight of the adhesive composition.

(b) Photoinitiator

Meanwhile, in the present invention, the (b) photoinitiator is a component having activity at a wavelength of 250 nm or more, which initiates photopolymerization at the wavelength transmitted from a base film to easily decrease the adhesive force of the adhesive layer, and it may be used in combination with amine compounds described below, in which case the adhesive force decreasing effect by photocuring may be further increased.

As the (b) photoinitiator, for example, thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, 2,4-diisopropyl thioxanthone, dodecyl thioxanthone, bis(2,4,6-trimethylbenzoyl)-phenylphosphine oxide, 2-methyl-1[4-(methylthio)phenyl]-2-morpholinopropan-1-one, oxy-phenyl-acetic acid 2-P-oxo-2-phenyl-acetoxy-ethoxyl-ethylester, oxy-phenyl-acetic acid 2[2-hydroxy-ethoxy]-ethylester, 2-benzyl-2-dimethylamino-1-(4-morpholinophenyl)-butan-1-one, and 2,4,6-trimethylbenzoyl-diphenyl-phosphine oxide may be mentioned. Preferably, isopropylthioxanthone, bis(2,4,6-trimethylbenzoyl)-phenylphosphine oxide may be used. These compounds may be used alone or in combinations of two or more kinds. The above described photoinitiators have excellent activities by UV transmitted through a base film, and when used in combination with tertiary amine compounds described below, due to the synergistic effect, may realize sufficient decrease in adhesive force in the photocuring step.

The (b) photoinitiator may be included in the content of 0.1 to 40 parts by weight, preferably 1 to 20 parts by weight, based on 100 parts by weight of the (a) binder resin, within which range effective curing reaction may be induced, and property deterioration due to residual components after curing may be prevented. If the content of the photoinitiator is less than 0.1 parts by weight, it may be difficult to sufficiently induce a curing reaction, and if it exceeds 40 parts by weight, it may not have sufficient viscosity, and thus, coatability may be deteriorated.

(c) Multifunctional Crosslinking Agent

And, the (c) multifunctional crosslinking agent reacts with the functional groups included in the (meth)acrylate resin having silicon-based functional groups and photoreactive functional groups in the components of the (a) binder resin, thus increasing the cohesive force of the adhesive composition.

Specifically, one or more compounds selected from the group consisting of isocyanate compounds, aziridine compounds, epoxy compounds, and metal chelate compounds may be used, and as the isocyanate compounds, aziridine compounds, epoxy compounds, and metal chelate compounds, any compounds commonly used in the art may be used without specific limitations.

As examples of the isocyanate compounds, one or more selected from the group consisting of tolylene diisocyanate, xylene diisocyanate, diphenylmethane diisocyanate, hexamethylene diisocyanate, isoboron diisocyanate, tetramethylxylene diisocyanate, naphthalene diisocyanate, and the reaction products of one of the above compounds with polyol (ex. trimethylol propane) may be mentioned. As examples of aziridine compounds, one or more selected from the group consisting of N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinyl phosphine oxide may be mentioned. As examples of epoxy compounds, one or more selected from the group consisting of ethylene glycol diglycidyl ether, triglycidyl ether, trimethylol propane triglycidyl ether, N,N,N,N-tetraglycidyl ethylenediamine and glycerine diglycidyl ether may be mentioned, and as examples of the metal chelate compounds, compounds wherein multivalent metal such as aluminum, iron, zinc, tin, titanium, antimony, magnesium and/or vanadium coordinates to acetyl acetone or ethyl acetoacetate may be used, but not limited thereto.

The (c) multifunctional crosslinking agent may be included in the content of 0.01 to 30 parts by weight, preferably 0.1 to 10 parts by weight, based on 100 parts by weight of the (a) binder resin. If the content of the multifunctional crosslinking agent is less than 0.01 parts by weight, the cohesive force of the adhesion layer may be deteriorated, and thus, there is a concern about cohesive failure during a high temperature process, and if it exceeds 30 parts by weight, the adhesive layer may not sufficiently secure an adhesive force before photocuring, and thus, there is a concern about delamination or lifting.

(d) Tertiary Amine Compound

Meanwhile, the adhesive composition of the present invention may further comprise, optionally, (d) a tertiary amine compound, together with the above described (a) to (c) components.

The (d) tertiary amine compound, when used in combination with the above described (b) photoinitiator, may realize increase in photocuring reactions even after a high temperature process, through a synergistic effect. Specifically, the (d) tertiary amine compound may perform a function as a hydrogen donor to realize a synergistic effect with the photoinitiator through the production of radicals.

As the (d) tertiary amine compound, for example, ethyl-p-dimethyl amino benzoate, methyl-p-dimethyl amino benzoate, 2-ethylhexyl-p-dimethyl amino benzoate, octyl-p-dimethyl amino benzoate, diethylaminoethyl methacrylate, dimethylaminoethyl methacrylate, N,N-dihydroxyethyl-p-toluidine, and the like may be mentioned, and preferably, ethyl-p-dimethyl amino benzoate, or 2-ethylhexyl-p-dimethyl amino benzoate may be used. These compounds may be used alone or in combinations of two or more kinds.

The tertiary amine compound may be included in the content of 100 to 2000 parts by weight, preferably 200 to 1500 parts by weight, based on 100 parts by weight of the photoinitiator. Within the above content range, a synergistic effect according to combination may be maximized. If the content of the tertiary amine compound is less than 100 parts by weight, it may not be sufficient for affording sufficient reactivity to the photoinitiator, and if it exceeds 2000 parts by weight, the adhesive composition may not have sufficient viscosity, and thus, coatability may be deteriorated.

And, the adhesive composition of the present invention may further comprise one or more additives selected from the group consisting of tackifying resin, an initiator, low molecular weight sieve, epoxy resin, a curing agent, a UV stabilizer, an antioxidant, color mix, a reinforcing agent, an antifoaming agent, surfactant, a blowing agent, an organic salt, a thickener, and a flame retardant, within a range that does not have an influence on the effects of the invention.

II. Adhesive Sheet for Temporary Fixing

According to another embodiment of the present invention, an adhesive sheet for temporary fixing comprising a base film and an adhesive layer is provided, wherein the adhesive layer comprises the above described adhesive composition.

Since the adhesive layer is prepared using the adhesive composition, sufficient adhesive force may be realized during a semiconductor manufacturing process even under high temperature conditions, and adhesive force may be easily lowered by photocuring in a peeling step. Particularly, by using (meth)acrylate resin having silicon-based functional groups and photoreactive functional groups as binder resin, even if a wavelength is transmitted from the base film at relatively low transmittance, excellent photoinitiation efficiency and excellent adhesive force lowering effect even after a high temperature process may be realized. And, in case further comprising an amine compound, increase in photocuring reactions may be realized even after a high temperature process, through the synergistic effect with the photoinitiator.

Specifically, the adhesive sheet for temporary fixing of the present invention has a rate of change in the adhesive force of the adhesive layer, defined according to the following Mathematical Formula 1, of 30% or less.

Rate of change in the adhesive force of adhesive layer (%)=$A2\times100/A1$ [Mathematical Formula 1]

In the Mathematical Formula 1, A1 is the adhesive force of the adhesive layer, after heat treating at 240 to 260° C. for 1 to 20 minutes, and A2 is the adhesive force of the adhesive layer, measured after the heat-treated adhesive layer is irradiated with UV light of complex wavelength in the region of 200 nm to 500 nm, at a light quantity of 100 mJ/cm$^2$ to 2000 mJ/cm$^2$.

The rate of change in the adhesive force of the adhesive layer according to the Mathematical Formula 1 is an index showing the realization of excellent adhesive force even under high temperature conditions in a semiconductor manufacturing process, and the sufficient adhesive force lowering effect by photocuring in a peeling step, and since the adhesive sheet for temporary fixing according to the present invention has the rate of change in adhesive force according to the Mathematical Formula 1 of 30% or less, it may be applied in a semiconductor manufacturing process, to remarkably improve process efficiency and manufacture semiconductor of high quality.

Base Film

In the adhesive sheet for temporary fixing of the present invention, the base film may be a polymer base film, preferably a polymer base film having a glass transition temperature (Tg) of 60° C. or more. By fulfilling the requirement that the glass transition temperature of the base film is 60° C. or more, sufficient heat resistance may be exhibited, and thus, wrinkles and deformation may not be generated during a high temperature process, and a semiconductor process may be easily conducted.

If the glass transition temperature of the base film is less than 60° C., degradation and deformation under high temperature conditions generated during a semiconductor manufacturing process may have an influence on the process. Thus, defects may be generated in a semiconductor process. The glass transition temperature of the base film may be preferably 70° C. or more, or 90° C. or more. In this case, the above explained effect may be further increased.

The polymer base film may include, for example, one or more polymer compounds selected from the group consisting of polyimide, polyamideimide, polyetheretherketone, polyethyleneterephthalate, polyethylenenaphthalate, polyphenylene sulfide and polyamide. Preferably, it may include polyimide, polyamide or polyamideimide.

In case the base film includes a mixture of two or more kinds of polymers, it may be a laminated film including films respectively comprising the above explained polymers, or a mono-layer film comprising two or more kinds of the above described polymers.

And, since the base film not only comprises the above described heat resistant polymer component, but also fulfills the requirement that transmittance at the wavelength of 300 nm or more is 50% or more, it allows the photoinitiator in the adhesive layer to easily initiate a photopolymerization reaction.

If the transmittance at the wavelength of 300 nm or more is less than 50%, light absorption of the photoinitiator in the adhesive layer may not be sufficient, and thus, adhesive force may not be sufficiently lowered in the step of separating an adhesive sheet.

The thickness of the base film is not specifically limited, but it may be commonly formed to a thickness of 5 to 500 μm, preferably 10 to 300 μm, or 25 to 100 μm. In this case, it can support during a high temperature semiconductor process, and an adhesive sheet may be peeled off without damage in a peeling step.

The base film may be passed through additional treatment for improvement in the performances, within a range that does not have an influence on the aimed effects of the present invention. For example, on the surface of the base film, common physical or chemical treatment such as mat treatment, corona discharge treatment, primer treatment or crosslink treatment may be applied.

Adhesive Layer

In the adhesive sheet for temporary fixing of the present invention, the adhesive layer may be formed on one side of the base film, and it comprises the above described adhesive composition.

A method of forming an adhesive layer comprising the above described components on a base film is not specifically limited, and for example, the composition for forming an adhesive layer of the present invention may be directly coated on a base film to form an adhesive layer, or the composition for forming an adhesive layer may be first coated on a peelable substrate to prepare an adhesive layer, and then, the adhesive layer may be transcribed on a base film using the peelable substrate.

Wherein, the methods of coating and drying the composition for forming an adhesive layer are not specifically limited, and for example, a composition comprising the components may be coated as it is, or may be diluted in an appropriate organic solvent and coated by known means such as a comma coater, a gravure coater, a die coater or a reverse coater, and the like, and then, the solvent may be dried at a temperature of 60° C. to 200° C. for 10 seconds to 30 minutes. And, an aging process may be additionally conducted so as to progress sufficient crosslinking reaction of the adhesive.

The thickness of the adhesive layer is not specifically limited, but specifically, it may be formed to a thickness of 5 to 100 μm. If the adhesive layer is formed within the above thickness range, it can support in a high temperature semiconductor process, and it can be peeled off without damage in the peeling step of an adhesive sheet.

And, the adhesive sheet for temporary fixing of the present invention may further comprise a release film formed on the adhesive layer. As the examples of the release films that can be used, one kind or two or more kinds of plastic films such as a polyethylene terephthalte film, a polytetrafluoroethylene film, a polyethylene film, a polypropylene film, a polybutene film, a polybutadiene film, a vinylchloride copolymer film, or a polyimide film, and the like may be mentioned.

The surface of the release film may be treated with one kind or two or more kinds of release agents such as alkyd-based, silicon-based, fluorine-based, unsaturated ester-based, polyolefin-based or wax-based release agent, and the like. Among them, alkyd, silicon or fluorine-based release agent having heat resistance is particularly preferable.

The release film may be commonly formed to a thickness of 10 μm to 500 μm, preferably about 20 μm to 200 μm, but the thickness is not limited thereto.

The adhesive sheet for temporary fixing according to the present invention may be used for a protection and carrier film of a semiconductor process.

And, the adhesive sheet for temporary fixing according to the present invention may comprise one or more adhesive layers, and thus, it may be formed on one side or both sides of the base film.

And, the method for preparing the adhesive sheet for temporary fixing is not specifically limited, and for example, an adhesive layer and a release film (if necessary) may be sequentially formed on a base film, or a release film including an adhesive layer may be separately prepared, and then, it may be laminated to a base film.

The lamination method is not specifically limited, and a hot roll laminate method or a laminate press method may be used, and among them, hot roll laminate method is preferable in terms of the possibility of a continuous process and efficiency. The hot roll laminate method may be conducted at a temperature of 10° C. to 100° C. and a pressure of 0.1 Kgf/cm$^2$ to 10 Kgf/cm$^2$, but not limited thereto.

FIGS. 1a to 1b and FIGS. 2a to 2b respectively show the cross sectional view of the adhesive sheet for temporary fixing (10) according to one embodiment of the present invention.

Referring to FIG. 1a, the adhesive sheet for temporary fixing (10) according to one embodiment of the present invention may have a structure wherein a base film (100) and an adhesive layer (200) are laminated.

In case the adhesive sheet (10) is applied in a semiconductor manufacturing process, the side (200(a)) of the adhesive layer (200) on which the base film (100) is not formed may be attached to a predetermined part of a semiconductor device.

Referring to FIG. 1b, the adhesive sheet for temporary fixing (10) according to one embodiment of the present invention may have a structure wherein a base film (100), an adhesive layer (200) and a release film (300) are sequentially laminated.

In case the adhesive sheet (10) is applied for a semiconductor manufacturing process, the release film (300) may be peeled off from the adhesive layer (200), and then, one side of the adhesive layer (200) from which the release film (300) has been peeled off may be attached to a predetermined part of a semiconductor device.

Referring to FIG. 2a, the adhesive sheet for temporary fixing (10) according to one embodiment of the present invention may have a structure wherein two adhesive layers (210, 220) are respectively formed on both sides of a base film (100).

In this case, the first adhesive layer (210), the base film (100), and the second adhesive layer (220) may be sequentially laminated.

In case the adhesive sheet (10) is applied for a semiconductor manufacturing process, the side of any one adhesive layer, on which the base film (100) is not formed, may be attached to a predetermined part of a semiconductor device. For example, the side (220(a)) of the second adhesive layer (220), on which the base film (100) is not formed, may be attached to a predetermined part of a semiconductor device.

Referring to FIG. 2b, the adhesive sheet for temporary fixing (10) according to one embodiment of the present invention may have a structure wherein a first release film (310), a first adhesive layer (210), a base film (100), a second adhesive layer (220) and a second release film (320) are sequentially laminated.

In case the adhesive sheet (10) is applied for a semiconductor manufacturing process, the second release film (320) may be peeled off from the second adhesive layer (220), and then, one side of the second adhesive layer (220), from which the second release film (320) has been peeled off, may be attached to a predetermined part of a semiconductor device.

Thereafter, in the peeling step of the adhesive sheet (10), UV may be irradiated toward the first adhesive layer (210) to pass through the lower base film (100), thus photocuring the second adhesive layer (220). Thereby, the adhesive force of the second adhesive layer (220) may be lowered, and thus, the adhesive sheet (10) for temporary fixing may be easily peeled off from a semiconductor device.

Commonly, during the manufacture of a semiconductor device, processes conducted under high temperature conditions are included, and in this case, there were problems in that a base film or an adhesive layer may be thermally decomposed, or additives included in an adhesive layer may be deinserted. In such a case, sufficient adhesive force was not realized during the semiconductor manufacturing process, or adhesive force was not sufficiently lowered in the step of peeling an adhesive sheet by photocuring.

The adhesive sheet for temporary fixing according to the present invention solves the above described problems, by forming a base film with heat resistant polymer having UV transmission property, and forming an adhesive layer with specific components capable of initiating photopolymerization at the transmission wavelength region of the base film and improving the reactivity, and thus, the efficiency of the semiconductor manufacturing process may be increased and the quality of manufactured semiconductor may be improved.

Advantageous Effects

The adhesive composition according to the present invention exhibits optimum adhesive force during a semiconductor manufacturing process, and sufficiently lowered adhesive force during photocuring, and thus, can be easily peeled off. Even after a high temperature process, foaming and lifting are not generated. Thus, the adhesive composition according to the present invention is useful for the preparation of an adhesive sheet.

BRIEF DESCRIPTION OF THE DRAWINGS

FIGS. 1a to 1b and FIGS. 2a to 2b respectively show the structure of the cross section of the adhesive sheet for temporary fixing (10) according to one embodiment of the present invention.

FIG. 3 is a photograph observing the appearance of the adhesive sheet for temporary fixing according to Example 1, after heat treatment.

FIG. 4 is a photograph observing the appearance of the adhesive sheet for temporary fixing according to Comparative Example 1, after heat treatment.

EXPLANATION OF REFERENCE NUMERALS AND SYMBOLS

10: adhesive sheet for temporary fixing
100: base film
200: adhesive layer
300: release film Detailed Description of the Embodiments Hereinafter, preferable examples are presented for better understanding of the present invention. However, these examples are presented only as the illustrations of the invention, and the present invention is not limited thereby.
<Preparation of an Adhesive Composition>

Preparation Example 1

Into a reactor in which nitrogen gas is refluxed and a cooling device is installed so as to facilitate temperature control, a monomer mixture consisting of 62.5 g of ethylhexyl acrylate (EHA), 20 g of silicone (meth)acrylate (Silaplane™ FM-0721 manufactured from JNC Corporation), and 17.5 g of hydroxyethyl acrylate (HEA) was introduced. Subsequently, based on 100 g of the monomer mixture, 200 g of ethylacetate (EAc) was introduced as a solvent, and while nitrogen was introduced so as to remove oxygen in the reactor, the mixture was sufficiently mixed at 30° C. for more than 60 minutes. Thereafter, a temperature was raised to and maintained at 65° C., 0.1 g of an initiator of azobisisobutylonitrile (V-60™ manufactured from Wako Pure Chemical Industries) was introduced portionwise to initiate a reaction, and then, polymerization was progressed for 6 hours to prepare a primary reaction product.

To the primary reaction product, 20 g of methacryloyl isocyanate (MOI) (85.5 mol %, based on HEA in the primary reaction product) and 0.08 g of a catalyst (dibutyltin dilaurate, DBTDL) were added, and reacted at 40° C. for 24 hours to introduce UV curable groups at the side chain of the polymer in the primary reaction product, thus preparing binder resin (a-1).

100 g of the binder resin (a-1) was mixed with 2.0 g of toluene diisocyanate (TDI) as a multifunctional crosslinking agent, 1.2 g of isopropyl thioxanthone (ITX) as a photoinitiator, and 6.0 g of ethyl-p-dimethyl amino benzoate as an amine-based compound to prepare an adhesive composition.

Preparation Example 2

Into a reactor in which nitrogen gas is refluxed and a cooling device is installed so as to facilitate temperature control, a monomer mixture consisting of 52.5 g of ethylhexyl acrylate (EHA), 30 g of silicone (meth)acrylate (Silaplane™ FM-0721 manufactured from JNC Corporation), and 17.5 g of hydroxyethyl acrylate (HEA) was introduced. Subsequently, based on 100 g of the monomer mixture, 200 g of ethylacetate (EAc) was introduced as a solvent, and while nitrogen was introduced so as to remove oxygen in the reactor, the mixture was sufficiently mixed at 30° C. for more than 60 minutes. Thereafter, a temperature was raised to and maintained at 65° C., 0.1 g of an initiator of azobisisobutylonitrile (V-60™ manufactured from Wako Pure Chemical Industries) was introduced portionwise to initiate a reaction, and then, polymerization was progressed for 6 hours to prepare a primary reaction product.

To the primary reaction product, 20 g of methacryloyl isocyanate (MOI) (85.5 mol %, based on HEA in the primary reaction product) and 0.08 g of a catalyst (dibutyltin dilaurate, DBTDL) were added, and reacted at 40° C. for 24 hours to introduce UV curable groups at the side chain of the polymer in the primary reaction product, thus preparing binder resin (a-2).

100 g of the binder resin (a-2) was mixed with 2.0 g of toluene diisocyanate (TDI) as a multifunctional crosslinking agent, 1.2 g of isopropyl thioxanthone (ITX) as a photoinitiator, and 6.0 g of ethyl-p-dimethyl amino benzoate as a tertiary amine-based compound to prepare an adhesive composition.

Preparation Example 3

Into a reactor in which nitrogen gas is refluxed and a cooling device is installed so as to facilitate temperature control, a monomer mixture consisting of 37 g of ethylhexyl acrylate (EHA), 25.5 g of butyl acraylte (BA), 20 g of silicone (meth)acrylate (Silaplane™ FM-0721 manufactured from JNC Corporation), and 17.5 g of hydroxyethyl acrylate (HEA) was introduced. Subsequently, based on 100 g of the monomer mixture, 200 g of ethylacetate (EAc) was introduced as a solvent, and while nitrogen was introduced so as to remove oxygen in the reactor, the mixture was sufficiently mixed at 30° C. for more than 60 minutes. Thereafter, a temperature was raised to and maintained at 65° C., 0.1 g of an initiator of azobisisobutylonitrile (V-60™ manufactured from Wako Pure Chemical Industries) was introduced portionwise to initiate a reaction, and then, polymerization was progressed for 6 hours to prepare a primary reaction product.

To the primary reaction product, 20 g of methacryloyl isocyanate (MOI) (85.5 mol %, based on HEA in the primary reaction product) and 0.08 g of a catalyst (dibutyltin dilaurate, DBTDL) were added, and reacted at 40° C. for 24 hours to introduce UV curable groups at the side chain of the polymer in the primary reaction product, thus preparing binder resin (a-3).

100 g of the binder resin (a-3) was mixed with 2.0 g of toluene diisocyanate (TDI) as a multifunctional crosslinking agent, 1.2 g of isopropyl thioxanthone (ITX) as a photoinitiator, and 6.0 g of ethyl-p-dimethyl amino benzoate as a tertiary amine-based compound to prepare an adhesive composition.

Comparative Preparation Example 1

Into a reactor in which nitrogen gas is refluxed and a cooling device is installed so as to facilitate temperature control, a monomer mixture consisting of 82.5 g of ethylhexyl acrylate, and 17.5 g of hydroxyethyl acrylate (HEA) was introduced. Subsequently, based on 100 g of the monomer mixture, 200 g of ethylacetate (EAc) was introduced as a solvent, and while nitrogen was introduced so as to remove oxygen in the reactor, the mixture was sufficiently mixed at 30° C. for more than 60 minutes. Thereafter, a temperature was raised to and maintained at 65° C., 0.1 g of an initiator of azobisisobutylonitrile (V-60™ manufactured from Wako Pure Chemical Industries) was introduced portionwise to initiate a reaction, and then, polymerization was progressed for 6 hours to prepare a primary reaction product.

To the primary reaction product, 20 g of methacryloyl isocyanate (MOI) (85.5 mol %, based on HEA in the primary reaction product) and 0.08 g of a catalyst (dibutyltin dilaurate, DBTDL) were added, and reacted at 40° C. for 24 hours to introduce UV curable groups at the side chain of the polymer in the primary reaction product, thus preparing (meth)acrylate-based binder resin (b-1).

100 g of the (meth)acrylate-based binder resin (b-1) was mixed with 2.0 g of TDI-based isocyanate curing agent, 1.2 g of isopropyl thioxanthone (ITX) as a photoinitiator, and 6.0 g of ethyl-p-dimethyl amino benzoate as a tertiary amine-based compound to prepare a composition for forming an adhesive layer.

Comparative Preparation Example 2

Into a reactor in which nitrogen gas is refluxed and a cooling device is installed so as to facilitate temperature control, a monomer mixture consisting of 62.5 g of ethylhexyl acrylate, 20 g of silicone (meth)acrylate (Silaplane™ FM-0721 manufactured from JNC Corporation) and 17.5 g of hydroxyethyl acrylate (HEA) was introduced. Subsequently, based on 100 g of the monomer mixture, 200 g of ethylacetate (EAc) was introduced as a solvent, and while nitrogen was introduced so as to remove oxygen in the reactor, the mixture was sufficiently mixed at 30° C. for more than 60 minutes. Thereafter, a temperature was raised to and maintained at 65° C., 0.1 g of an initiator of azobisisobutylonitrile (V-60™ manufactured from Wako Pure Chemical Industries) was introduced portionwise to initiate a reaction, and then, polymerization was progressed for 6 hours to prepare a primary reaction product.

To the primary reaction product, 10 g of methacryloyl isocyanate (MOI) (42.7 mol %, based on HEA in the primary reaction product) and 0.045 g of a catalyst (dibutyltin dilaurate, DBTDL) were added, and reacted at 40° C. for 24 hours to introduce UV curable groups at the side chain of the polymer in the primary reaction product, thus preparing binder resin (b-2).

100 g of the binder resin (b-2) was mixed with 2.0 g of toluene diisocyanate (TDI) as a multifunctional crosslinking agent, 1.2 g of isopropyl thioxanthone (ITX) as a photoinitiator, and 6.0 g of ethyl-p-dimethyl amino benzoate as a tertiary amine-based compound to prepare an adhesive composition.

Comparative Preparation Example 3

Into a reactor in which nitrogen gas is refluxed and a cooling device is installed so as to facilitate temperature control, a monomer mixture consisting of 62.5 g of ethylhexyl acrylate, 20 g of silicone (meth)acrylate and 17.5 g of hydroxyethyl acrylate (HEA) was introduced. Subsequently, based on 100 g of the monomer mixture, 200 g of ethylacetate (EAc) was introduced as a solvent, and while nitrogen was introduced so as to remove oxygen in the reactor, the mixture was sufficiently mixed at 30° C. for more than 60 minutes. Thereafter, a temperature was raised to and maintained at 65° C., 0.1 g of an initiator of azobisisobutylonitrile (V-60™ manufactured from Wako Pure Chemical Industries) was introduced portionwise to initiate a reaction, and then, polymerization was progressed for 6 hours to prepare a primary reaction product.

To the primary reaction product, 22.9 g of methacryloyl isocyanate (MOI) (97 mol %, based on HEA in the primary reaction product) and 0.091 g of a catalyst (dibutyltin dilaurate, DBTDL) were added, and reacted at 40° C. for 24 hours to introduce UV curable groups at the side chain of the polymer in the primary reaction product, thus preparing binder resin (b-3).

100 g of the binder resin (b-3) was mixed with 2.0 g of toluene diisocyanate (TDI) as a multifunctional crosslinking agent, 1.2 g of isopropyl thioxanthone (ITX) as a photoinitiator, and 6.0 g of ethyl-p-dimethyl amino benzoate as a tertiary amine-based compound to prepare an adhesive composition.

Comparative Preparation Example 4

An adhesive composition was prepared by the same method as Preparation Example 1, except that the binder resin (b-1) of Comparative Preparation Example 1 was used as binder resin when preparing an adhesive composition, and silicone (meth)acrylate was further added.

Specifically, 80 g of the binder resin (b-1) prepared in Comparative Preparation Example 1 was mixed with 20 g of silicone (meth)acrylate, 2.0 g of toluene diisocyanate (TDI) as a multifunctional crosslinking agent, 1.2 g of isopropyl thioxanthone (ITX) as a photoinitiator, and 6.0 g of ethyl-p-dimethyl amino benzoate as an amine-based compound to prepare an adhesive composition.

The content of each repeat unit in the binder resin prepared in Preparation Examples 1-3 and Comparative Preparation Examples 1-3, and the properties (Mw and Tg) were analyzed and measured, and the results were shown in the following Table 1.

In the following Table 1, the content of each repeat unit in the binder resin was calculated through NMR analysis. And, Mw is weight average molecular weight converted in terms of polystyrene, measured using GPC, and Tg is a glass transition temperature measured with DSC.

TABLE 1

| | Kind of binder resin | Content of repeat unit in the binder resin | | | | Mw (g/mol) | Tg (° C.) |
|---|---|---|---|---|---|---|---|
| | | Silicone (meth)acrylate-derived first repeat units (wt %, based on total weight of binder resin) | HEA-derived second repeat units (wt %, based on total weight of binder resin) | EHA and/or BA-derived third repeat units (wt %, based on total weight of binder resin) | Photoreactive functional group-introduced second repeat units (wt %, based on total weight of HEA-derived second repeat unit) | | |
| Preparation Example 1 | a-1 | 20 | 20.5 | 59.5 | 95 | 1,100,000 | −43.6 |
| Preparation Example 2 | a-2 | 30 | 20.5 | 49.5 | 95 | 1,070,000 | −38.5 |
| Preparation Example 3 | a-3 | 20 | 20.5 | 59.5 | 95 | 1,200,000 | −34.7 |
| Comparative Preparation Example 1 | b-1 | — | 20.5 | 79.5 | 95 | 1,200,000 | −48.4 |
| Comparative Preparation Example 2 | b-2 | 20 | 20.5 | 59.5 | 15 | 1,100,000 | −49.9 |
| Comparative Preparation Example 3 | b-3 | 20 | 20.5 | 59.5 | 99.9 | 1,100,000 | −41.6 |

<Preparation of an Adhesive Sheet for Temporary Fixing>

Example 1

The adhesive composition of Preparation Example 1 was coated on a release-treated polyethylene terephthate film (thickness 38 μm, glass transition temperature: 120° C.), and then, dried at 110° C. for 3 minutes to form an adhesive layer of about 30 μm thickness. The formed adhesive layer was laminated to a polyimide base film of 50 μm thickness, and then, aged to obtain an adhesive sheet for temporary fixing.

Examples 2 to 3 and Comparative Examples 1 to 4

Adhesive sheets for temporary fixing were prepared by the same method as Example 1, except that the components and amounts of the following Table 2 were used.

TABLE 2

| | Example 1 | Example 2 | Example 3 | Comparative Example 1 | Comparative Example 2 | Comparative Example 3 | Comparative Example 4 |
|---|---|---|---|---|---|---|---|
| Base film | polyimide | polyimide | polyimide | polyimide | polyimide | polyimide | polyimide |
| Adhesive composition for forming adhesive layer | Preparation Example 1 | Preparation Example 2 | Preparation Example 3 | Comparative Preparation Example 1 | Comparative Preparation Example 2 | Comparative Preparation Example 3 | Comparative Preparation Example 4 |

Experimental Example: Evaluation of Adhesive Force and Peel Strength

For the adhesive sheets for temporary fixing prepared according to Examples and Comparative Examples, adhesive force and peel strength according to photocuring were evaluated as follows, and the results were shown in the following Table 3.

Each adhesive sheet for temporary fixing prepared in Examples and Comparative Examples was cut to a width of 25 mm, and then, attached to a silicon wafer using a 2 kg roller, thus preparing a sample A (before heat treatment).

Next, the adhesive sheet for temporary fixing, attached to a silicon wafer, was left in an oven of 250° C. for 10 minutes to prepare a heat-treated sample B (after heat treatment).

To the above prepared non-heat-treated sample A and heat-treated sample B, UV (using a mercury lamp having a complex wavelength of 200 nm to 500 nm region) was irradiated from the base film at the light quantity of 1000 mJ/cm², and adhesive force was measured.

The adhesive force (gf/25 mm) was measured at a speed of 300 mm/min and an angle of 180 degree using a Texture Analyzer of Stable Micro Systems, and the results were shown in the following Table 3.

And, from the measured adhesive force, a rate of change in the adhesive force of the adhesive layer was calculated according to the following Mathematical Formula 1.

Rate of change in the adhesive force of the adhesive layer (%) = $A2 \times 100 / A1$   [Mathematical Formula 1]

(in the Mathematical Formula 1, A1 is the adhesive force of the adhesive layer after heat treating at 250° C. for 10 minutes, A2 is the adhesive force of the adhesive layer, after irradiating UV of complex wavelength of 200 nm to 500 nm region to the heat-treated adhesive layer at the light quantity of 100 mJ/cm² to 2000 mJ/cm²)

And, foaming and lifting in the heat-treated sample B were observed with the unaided eyes. The results were respectively shown in FIGS. 3 and 4. FIG. 3 and FIG. 4 are photographs observing the appearance after heat treatment of the adhesive sheets for temporary fixing of Example 1 and Comparative Example 1, respectively.

TABLE 3

| | Non-heat-treated sample A Evaluation of adhesive force(gf/25 mm) | | Heat-treated sample B Evaluation of adhesive force(gf/25 mm) | | Rate of change in adhesive force(%) | Heat-treated sample B Evaluation of appearance property (foaming and lifting) |
|---|---|---|---|---|---|---|
| | Before UV irradiation | After UV irradiation | Before UV irradiation | After UV irradiation | | |
| Example 1 | 38 | 6 | 135 | 33 | 24.4 | Not generated |
| Example 2 | 31 | 5 | 98 | 25 | 25.5 | Not generated |
| Example 3 | 46 | 7 | 152 | 38 | 25.0 | Not generated |
| Comparative Example 1 | 43 | 11 | 347 | 193 | 55.6 | Generated |
| Comparative Example 2 | 67 | 43 | 512 | 381 | 74.4 | Generated |
| Comparative Example 3 | transcribed | 15 | transcribed | Transcribed | | Generated |
| Comparative Example 4 | ND | ND | ND | ND | ND | ND |

In the Table 3, ND means non-measurable.

As confirmed from the experimental results of the heat-treated sample B of the Table 3, the adhesive sheets for temporary fixing of Examples 1 to 3 prepared according to the present invention can be removed without adhesive residue when peeled from a silicon wafer, because adhesive force after high temperature heat treatment was significantly lowered. And, the adhesive sheets for temporary fixing of Examples 1 to 3 did not exhibit deterioration of appearance property such as foaming or lifting even after heat treatment at a high temperature of 250° C.

To the contrary, the adhesive sheet for temporary fixing of Comparative Example 1, which was prepared using (meth)acrylate resin including only photoreactive functional groups without silicon-based functional groups as binder, exhibited high adhesive force even after heat treatment, and thus, adhesive residue was generated when peeled from a silicon wafer, and foaming and lifting were generated on the surface after heat treatment.

And, the adhesive sheet for temporary fixing of Comparative Example 2, wherein (meth)acrylate resin including photoreactive functional groups together with silicon functional groups is used as binder, but the content of the second repeat units in which the photoreactive functional groups are introduced is less than 20 wt % based on the total weight of the second repeat units in the (meth)acrylate resin, exhibited high adhesive force even after heat treatment, and thus, adhesive residue was generated when peeled from a silicon wafer, and like Comparative Example 1, foaming and lifting were generated on the surface after heat treatment.

And, in the case of the adhesive sheet for temporary fixing of Comparative Example 3, wherein the content of the second repeat units in which the photoreactive functional groups are introduced is greater than 95 wt % based on the total weight of the second repeat units in the (meth)acrylate resin, transcription was generated after heat treatment, and like Comparative Examples 1 and 2, foaming and lifting were generated on the surface after heat treatment.

Meanwhile, in the case of the adhesive of Comparative Example 4, which was prepared by simply mixing (meth)acrylate binder resin including only photoreactive functional groups without silicon-based functional groups with silicone (meth)acrylate, due to low compatibility of (meth)acrylate binder resin and silicone (meth)acrylate, phase separation and gelation were progressed during stirring, and thus, could not be prepared into an adhesive sheet.

The invention claimed is:

1. An adhesive composition comprising:
(a) a binder resin comprising a (meth)acrylate resin having a silicon-based functional group and a photoreactive functional group;
(b) a photoinitiator; and
(c) a multifunctional crosslinking agent,
wherein the (meth)acrylate resin comprises a first repeat unit derived from a (meth)acrylate monomer having a silicon-based functional group, and a second repeat unit derived from a crosslinkable monomer having one or more reactive functional groups selected from the group consisting of a hydroxyl group, a carboxy group and a nitrogen-containing functional group, and
based on the total weight of the second repeat unit, 20 to 95 wt % of the second repeat unit comprises a photoreactive functional group at side chains, and
wherein the first repeat unit is comprised in an amount of 20 to 80 wt %, based on the total weight of the (meth)acrylate resin having the silicon-based functional group and photoreactive functional group.

2. The adhesive composition according to claim 1, wherein the photoreactive functional group is a vinyl group, an allyl group, or a (meth)acryloyl group.

3. The adhesive composition according to claim 1, wherein the (meth)acrylate monomer having a silicon-based functional group comprises at least one of silicone (meth)acrylate represented by Chemical Formulae 2a to 2d:

[Chemical Formula_2a]

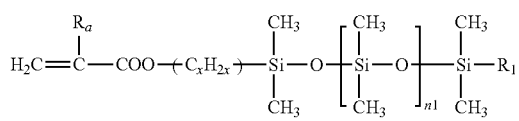

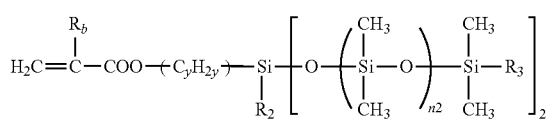

[Chemical Formula_2b]

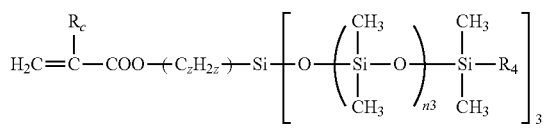

[Chemical Formula_2c]

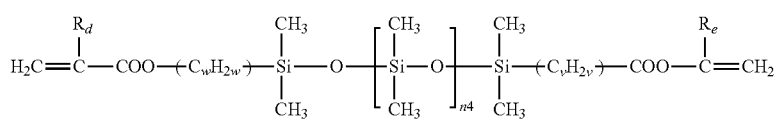

[Chemical Formula_2d]

in the Chemical Formulae 2a to 2d, $R_1$ to $R_4$ are each independently, a hydrogen atom, or a C1-10 alkyl group, $R_a$ to $R_e$ are each independently, hydrogen or a methyl group, x, y, z, w and v are each independently, an integer of 1 to 3, and n1 to n4 are each independently, an integer of 1 to 200.

4. The adhesive composition according to claim 1, wherein the crosslinkable monomer having one or more reactive functional groups comprises one or more selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxy propylene glycol (meth)acrylate, (meth)acrylic acid, crotonic acid, isocrotonic acid, maleci acid, fumaric acid, itaconic acid, carboxyethyl (meth)acrylate, carboxypentyl (meth)acrylate, (meth)acryloylonitrile, N-vinyl pyrrolidone, N-vinyl caprolactam, and 3-(N-methylaminopropyl) methacrylamide.

5. The adhesive composition according to claim 1, wherein the (meth)acrylate resin having a silicon-based functional group and a photoreactive functional group further comprises a third repeat unit derived from a (meth) acrylate-based compound having a C1-12 alkyl group.

6. The adhesive composition according to claim 5, wherein the (meth)acrylate resin having a silicon-based functional group and a photoreactive functional group comprises, based on the total weight of the (meth)acrylate resin, 20 to 40 wt % of the first repeat unit, 20 to 40 wt % of the second repeat unit, and 40 to 60 wt % of the third repeat unit, and based on the total weight of the second repeat unit, 70 to 95 wt % of the second repeat unit comprises a photoreactive functional group at the side chain.

7. The adhesive composition according to claim 1, wherein the (meth)acrylate resin has a weight average molecular weight of 50,000 g/mol to 2,000,000 g/mol, and a glass transition temperature of −100° C. to −5° C.

8. The adhesive composition according to claim 1, wherein the photoinitiator is at least one selected from the group consisting of thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, 2,4-diisopropyl thioxanthone, dodecyl thioxanthone, bis(2,4,6-trimethylbenzoyl)-phenylphosphine oxide, 2-methyl-1[4-(methylthio)phenyl]-2-morpholinopropan-1-one, oxy-phenyl-acetic acid 2-[2-oxo-2-phenyl-acetoxy-ethoxy]-ethylester, oxy-phenyl-acetic acid 2[2-hydroxy-ethoxy]ethylester, 2-benzyl-2-dimethylamino-1-(4-morpholinophenyl)-butan-1-one, and 2,4,6-trimethylbenzoyl-diphenyl-phosphine oxide.

9. The adhesive composition according to claim 1, wherein the multifunctional crosslinking agent comprises at least one compound selected from the group consisting of isocyanate compounds, aziridine compounds, epoxy compounds, and metal chelate compounds.

10. The adhesive composition according to claim 1, wherein the composition comprises, based on 100 parts by weight of the binder resin, 0.1 to 40 parts by weight of the photoinitiator, and 0.01 to 30 parts by weight of the multifunctional crosslinking agent.

11. The adhesive composition according to claim 1, further comprising a tertiary amine compound.

12. The adhesive composition according to claim 11, wherein the tertiary amine compound is selected from the group consisting of ethyl-p-dimethyl amino benzoate, methyl-p-dimethyl amino benzoate, 2-ethylhexyl-p-dimethyl amino benzoate, octyl-p-dimethyl amino benzoate, diethylaminoethyl methacrylate, dimethylaminoethyl methacrylate, N,N-dihydroxyethyl-p-toluidine, and a mixture thereof, and is comprised in an amount of 100 to 2000 parts by weight, based on 100 parts by weight of the photoinitiator.

13. An adhesive sheet for temporary fixing comprising a base film, and an adhesive layer,
wherein the adhesive layer comprises the adhesive composition according to claim 1.

14. The adhesive composition according to claim 1, wherein the first repeat unit is comprised in an amount of 20 to 40 wt %, based on the total weight of the (meth)acrylate resin having the silicon-based functional group and photoreactive functional group.

15. The adhesive composition according to claim 1, wherein the (meth)acrylate resin has a glass transition temperature of −70° C. to −10° C.

* * * * *